US011946187B2

(12) United States Patent
Damtew et al.

(10) Patent No.: US 11,946,187 B2
(45) Date of Patent: Apr. 2, 2024

(54) METHOD FOR PREVENTING ACCIDENTAL WASHING OF ELECTRONIC DEVICES IN A WASHING MACHINE APPLIANCE

(71) Applicant: Haier US Appliance Solutions, Inc., Wilmington, DE (US)

(72) Inventors: Fikreadam Abebe Damtew, Louisville, KY (US); Senthil Kandasamy, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 342 days.

(21) Appl. No.: 17/405,243

(22) Filed: Aug. 18, 2021

(65) Prior Publication Data

US 2023/0054399 A1 Feb. 23, 2023

(51) Int. Cl.
| | | |
|---|---|---|
| *D06F 37/42* | (2006.01) | |
| *D06F 34/05* | (2020.01) | |
| *D06F 34/14* | (2020.01) | |
| *D06F 105/58* | (2020.01) | |
| *D06F 105/60* | (2020.01) | |
| *H04W 4/80* | (2018.01) | |

(52) U.S. Cl.
CPC .............. *D06F 37/42* (2013.01); *D06F 34/05* (2020.02); *D06F 34/14* (2020.02); *H04W 4/80* (2018.02); *D06F 2105/58* (2020.02); *D06F 2105/60* (2020.02)

(58) Field of Classification Search
CPC ...................................................... D06F 37/42
See application file for complete search history.

(56) References Cited

U.S. PATENT DOCUMENTS

| | | | |
|---|---|---|---|
| 7,737,839 B1 | 6/2010 | Jones | |
| 8,482,425 B2 | 7/2013 | Lauer | |
| 9,416,477 B2 | 8/2016 | Kazuhiro | |
| 2011/0156899 A1* | 6/2011 | Lauer | .................... D06F 93/005 340/539.11 |
| 2017/0082991 A1* | 3/2017 | Belveal | .................... D06F 39/00 |
| 2018/0252795 A1 | 9/2018 | Amit | |
| 2020/0041673 A1 | 2/2020 | Ha | |
| 2022/0349102 A1* | 11/2022 | Yun | ........................ G06V 40/10 |

FOREIGN PATENT DOCUMENTS

JP          2004351124 A   * 12/2004

* cited by examiner

*Primary Examiner* — Spencer E. Bell
(74) *Attorney, Agent, or Firm* — Dority & Manning, P.A.

(57) ABSTRACT

A washing machine includes a cabinet, a door, a tub provided within the cabinet, a wireless communication module provided within the cabinet, and a controller in operative communication with the wireless communication module. The controller is configured to perform a series of operations, including receiving an initiation signal for a laundry operation to be performed by the washing machine appliance; sending a wake-up signal to a mobile electronic device via the wireless communication module in response to receiving the initiation signal; emitting a laundry operation trigger prior to initiating the laundry operation; determining that the mobile device is within a predetermined distance from the washing machine appliance in response to generating the laundry operation trigger; and receiving a confirmation signal before beginning the laundry operation.

20 Claims, 4 Drawing Sheets

METHOD FOR PREVENTING ACCIDENTAL WASHING OF ELECTRONIC DEVICES IN A WASHING MACHINE APPLIANCE

FIELD OF THE INVENTION

The present subject matter relates generally to washing machine appliances, and more particularly to methods for operating washing machine appliances within a connected home system.

BACKGROUND OF THE INVENTION

Washing machine appliances generally include a cabinet which receives a wash tub for containing water or wash fluid (e.g., water and detergent, bleach, or other wash additives). A wash basket is rotatably mounted within the wash tub and defines a wash chamber for receipt of articles for washing, for example, clothing. A drive assembly is coupled to the wash tub and configured to selectively rotate the wash basket within the wash tub.

Users of washing machine appliances typically possess one or more electronic devices. These electronic devices may be carried by the user, e.g., in pockets of clothing such as pants, jackets, or sweatshirts. Increasingly, users accidentally leave these electronic devices in the pockets of washing articles when adding the articles to the tub for washing. When water is supplied to the tub and a washing process is initiated, these electronic devices may be damaged, resulting in undue expenses to replace the device or devices, and/or potentially causing damage to the washing machine appliance. However, current washing machine appliances lack features that prevent the accidental washing of electronic devices.

Accordingly, a laundry machine appliance that obviates one or more of the above-mentioned drawbacks would be useful. Particularly, a washing machine appliance with features for detecting the presence of an electronic device would be desirable.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a washing machine appliance is provided. The washing machine appliance may include a cabinet, a door to selectively open and close the cabinet, a tub provided within the cabinet, the tub configured to hold wash fluid, a wash basket rotatably mounted within the tub and configured to hold items for washing, a wireless communication module provided within the cabinet and configured to send and receive wireless signals, and a controller in operative communication with the wireless communication module, wherein the controller is configured to perform a series of operations. The series of operations may include receiving an initiation signal for a laundry operation to be performed by the washing machine appliance, sending a wake-up signal to a mobile electronic device via the wireless communication module in response to receiving the initiation signal, emitting a laundry operation trigger prior to initiating the laundry operation, determining that the mobile electronic device is within a predetermined distance from the washing machine appliance in response to generating the laundry operation trigger, receiving a cycle authorization signal, and initiating the laundry operation.

In another exemplary aspect of the present disclosure, a method of operating a washing machine appliance is provided. The washing machine appliance may include a cabinet including a tub, a wireless communication module provided within the cabinet and configured to send and receive wireless signals, and a controller in operative communication with the wireless communication module. The method may include receiving an initiation signal for a laundry operation to be performed by the washing machine appliance, sending a wake-up signal to a mobile electronic device via the wireless communication module in response to receiving the initiation signal, emitting a laundry operation trigger prior to initiating the laundry operation, determining that the mobile electronic device is within a predetermined distance from the washing machine appliance in response to generating the laundry operation trigger, receiving a cycle authorization signal, and initiating the laundry operation.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
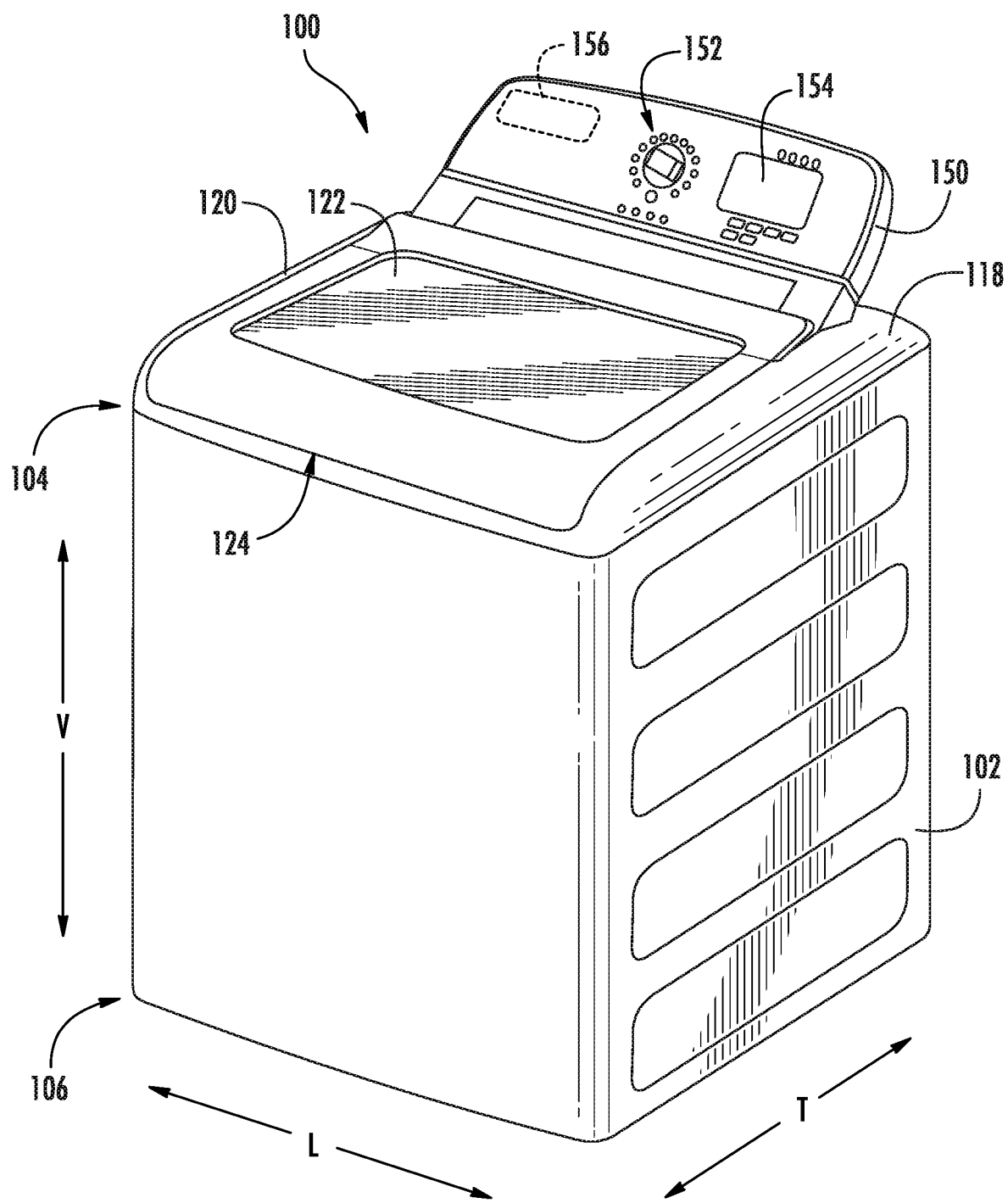
FIG. 1 provides a perspective view of a washing machine appliance according to an exemplary embodiment of the present subject matter with a door of the washing machine appliance shown in a closed position.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
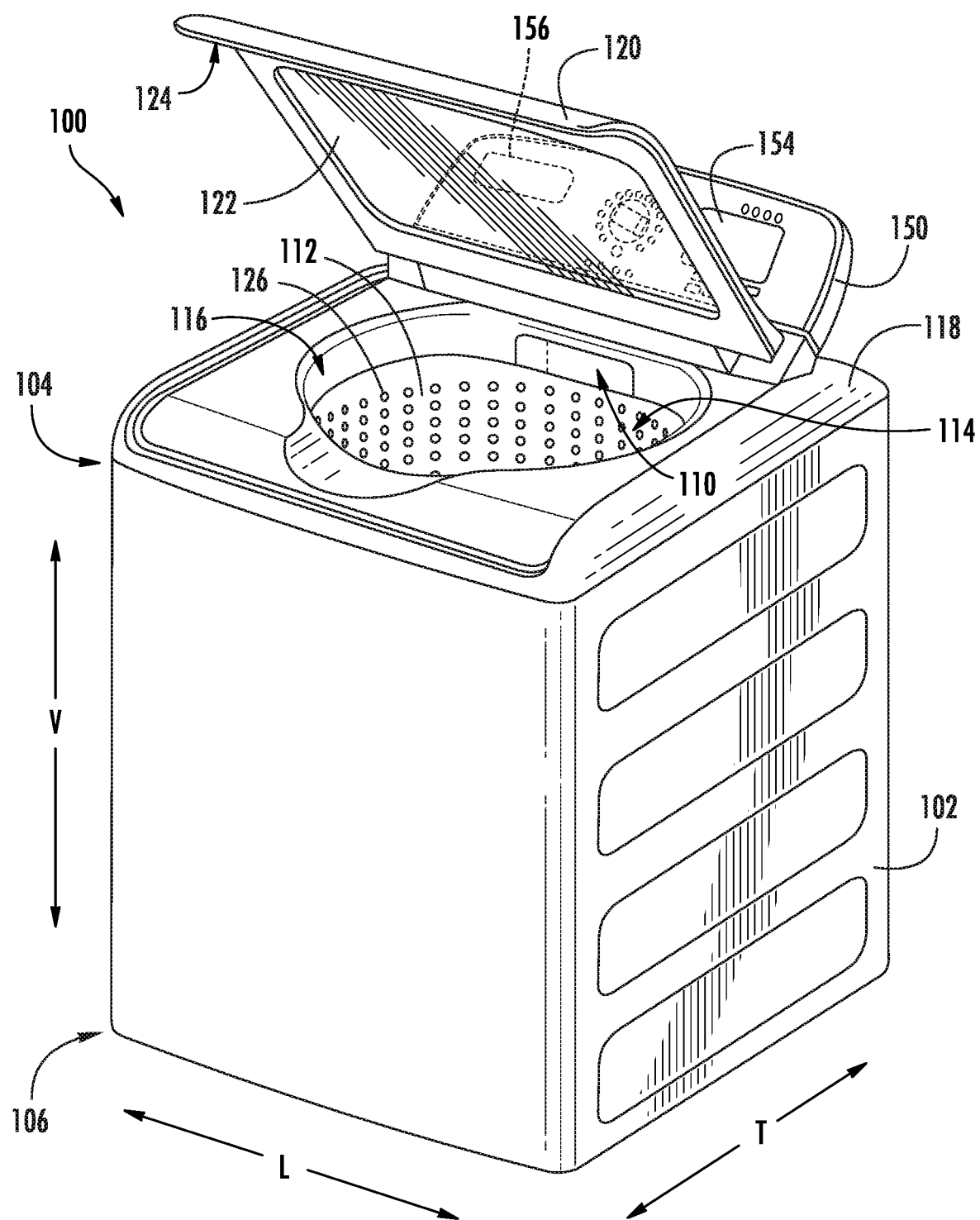
FIG. 2 provides a perspective view of the washing machine appliance of FIG. 1 with the door of the exemplary washing machine appliance shown in an open position.
Figure 3:
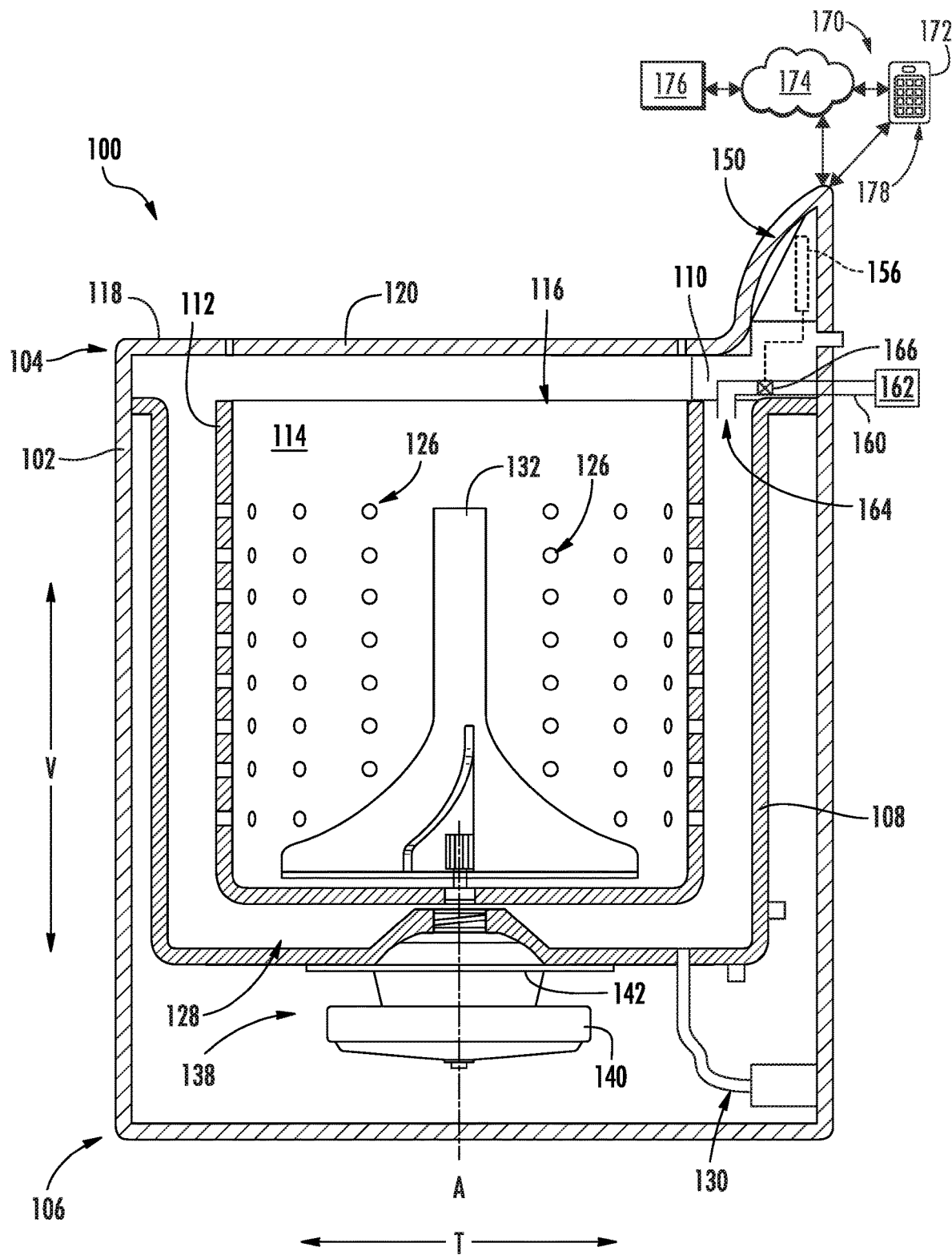
FIG. 3 provides a side, cross sectional view of the washing machine appliance of FIG. 1 according to an exemplary embodiment of the present subject matter.

FIGS. 1 through 3 illustrate an exemplary embodiment of a vertical axis washing machine appliance or laundry treatment apparatus 100. Specifically, FIGS. 1 and 2 illustrate perspective views of washing machine appliance 100 in a closed and an open position, respectively. FIG. 3 provides a side cross-sectional view of washing machine appliance 100. Washing machine appliance 100 generally defines a vertical direction V, a lateral direction L, and a transverse direction T, each of which is mutually perpendicular, such that an orthogonal coordinate system is generally defined.

While described in the context of a specific embodiment of a vertical axis washing machine, it should be appreciated that vertical axis washing machine appliance 100 is provided by way of example only. It will be understood that aspects of the present subject matter may be used in any other suitable washing machine appliance, such as a horizontal axis washing machine appliance. Indeed, modifications and variations may be made to washing machine appliance 100, including different configurations, different appearances, and/or different features while remaining within the scope of the present subject matter.

Washing machine appliance 100 has a cabinet 102 that extends between a top portion 104 and a bottom portion 106 along the vertical direction V. As best shown in FIG. 3, a tub 108 is positioned within cabinet 102 and is generally configured for retaining wash fluids during an operating cycle. Washing machine appliance 100 further includes a primary dispenser 110 (FIG. 2) for dispensing wash fluid into tub 108. The term "wash fluid" refers to a liquid used for washing and/or rinsing articles during an operating cycle and may include any combination of water, detergent, fabric softener, bleach, and other wash additives or treatments.

In addition, washing machine appliance 100 includes a wash basket 112 that is positioned within tub 108 and generally defines a wash chamber 114 including an opening 116 for receipt of articles for washing. More specifically, wash basket 112 is rotatably mounted within tub 108 such that it is rotatable about an axis of rotation A. According to the illustrated embodiment, the axis of rotation A is substantially parallel to the vertical direction V. In this regard, washing machine appliance 100 is generally referred to as a "vertical axis" or "top load" washing machine appliance 100. However, as noted above, it should be appreciated that aspects of the present subject matter may be used within the context of a horizontal axis or front load washing machine appliance as well.

As illustrated, cabinet 102 of washing machine appliance 100 has a top panel 118. Top panel 118 defines an opening (FIG. 2) that coincides with opening 116 of wash basket 112 to permit a user access to wash basket 112. Washing machine appliance 100 further includes a door 120 which is rotatably mounted to top panel 118 to permit selective access to opening 116. In particular, door 120 selectively rotates between the closed position (as shown in FIGS. 1 and 3) and the open position (as shown in FIG. 2). In the closed position, door 120 inhibits access to wash basket 112. Conversely, in the open position, a user can access wash basket 112. A window 122 in door 120 permits viewing of wash basket 112 when door 120 is in the closed position, e.g., during operation of washing machine appliance 100. Door 120 also includes a handle 124 that, e.g., a user may pull and/or lift when opening and closing door 120. Further, although door 120 is illustrated as mounted to top panel 118, door 120 may alternatively be mounted to cabinet 102 or any other suitable support.

As best shown in FIGS. 2 and 3, wash basket 112 further defines a plurality of perforations 126 to facilitate fluid communication between an interior of wash basket 112 and tub 108. In this regard, wash basket 112 is spaced apart from tub 108 to define a space for wash fluid to escape wash chamber 114. During a spin cycle, wash fluid within articles of clothing and within wash chamber 114 is urged through perforations 126 wherein it may collect in a sump 128 defined by tub 108. Washing machine appliance 100 further includes a drain pump assembly 130 (FIG. 3) that is located beneath tub 108 and wash basket 112 for gravity assisted flow when draining tub 108, e.g., after a wash or rinse cycle.

An impeller or agitator 132 (FIG. 3), such as a vane agitator, impeller, auger, oscillatory basket mechanism, or some combination thereof may be disposed in wash basket 112 to impart an oscillatory motion to articles and liquid in wash basket 112. More specifically, agitator 132 may extend into wash basket and assist agitation of articles disposed within wash basket 112 during operation of washing machine appliance 100, e.g., to facilitate improved cleaning. In different embodiments, agitator 132 includes a single action element (i.e., oscillatory only), a double action element (oscillatory movement at one end, single direction rotation at the other end) or a triple action element (oscillatory movement plus single direction rotation at one end, single direction rotation at the other end). As illustrated in FIG. 3, agitator 132 and wash basket 112 are oriented to rotate about the axis of rotation A (which is substantially parallel to vertical direction V). The agitator shown in FIG. 3 (agitator 132) is merely an example, and any suitable agitator may be incorporated. Additionally or alternatively, the agitator may be omitted entirely according to certain embodiments.

As best illustrated in FIG. 3, washing machine appliance 100 includes a drive assembly 138 in mechanical communication with wash basket 112 to selectively rotate wash basket 112 (e.g., during an agitation or a rinse cycle of washing machine appliance 100). In addition, drive assembly 138 may also be in mechanical communication with agitator 132. In this manner, drive assembly 138 may be configured for selectively rotating or oscillating wash basket 112 and/or agitator 132 during various operating cycles of washing machine appliance 100.

More specifically, drive assembly 138 may generally include one or more of a drive motor 140 and a transmission assembly 142, e.g., such as a clutch assembly, for engaging and disengaging wash basket 112 and/or agitator 132. According to the illustrated embodiment, drive motor 140 is a brushless DC electric motor, e.g., a pancake motor. However, according to alternative embodiments, drive motor 140 may be any other suitable type of motor. For example, drive motor 140 may be an AC motor, an induction motor, a permanent magnet synchronous motor, or any other suitable type of motor. In addition, drive assembly 138 may include any other suitable number, types, and configurations of support bearings or drive mechanisms.

Referring to FIGS. 1 through 3, a control panel 150 with at least one input selector 152 (FIG. 1) extends from top panel 118. Control panel 150 and input selector 152 collectively form a user interface input for operator selection of machine cycles and features. A display 154 of control panel 150 indicates selected features, operation mode, a countdown timer, and/or other items of interest to appliance users regarding operation.

Operation of washing machine appliance 100 is controlled by a controller or processing device 156 that is communicatively coupled with control panel 150 for user manipulation to select washing machine cycles and features. In response to user manipulation of control panel 150, controller 156 operates the various components of washing machine appliance 100 to execute selected machine cycles and features. As described in more detail below with respect to FIG. 5, controller 156 may include a memory and microprocessor, such as a general or special purpose microprocessor operable to execute programming instructions or micro-control code associated with methods described herein. Alternatively, controller 156 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Control panel 150 and other components of washing machine appliance 100 may be in communication with controller 156 via one or more signal lines or shared communication busses.

Referring to FIG. 3, washing machine appliance 100 includes a water supply conduit 160 that provides fluid communication between a water supply source 162 (such as a municipal water supply) and a discharge nozzle 164 for directing a flow of water into tub 108, and more specifically, into wash chamber 114. In addition, washing machine appliance 100 includes a water fill valve or water control valve 166 which is fluidly coupled with water supply conduit 160 and communicatively coupled to controller 156. In this manner, controller 156 may regulate the operation of water control valve 166 to regulate the amount of water within tub 108.

Referring still to FIG. 3, a schematic diagram of an external communication system 170 will be described according to an exemplary embodiment of the present subject matter. In general, external communication system 170 is configured for permitting interaction, data transfer, and other communications between appliance 100 and one or more external devices. For example, this communication may be used to provide and receive operating parameters, user instructions or notifications, performance characteristics, user preferences, or any other suitable information for improved performance of appliance 100. In addition, it should be appreciated that external communication system 170 may be used to transfer data or other information to improve performance of one or more external devices or appliances and/or improve user interaction with such devices.

For example, external communication system 170 permits controller 156 of appliance 100 to communicate with a separate device external to appliance 100, referred to generally herein as an external device 172. As described in more detail below, these communications may be facilitated using a wired or wireless connection, such as via a network 174. In general, external device 172 may be any suitable device separate from appliance 100 that is configured to provide and/or receive communications, information, data, or commands from a user. In this regard, external device 172 may be, for example, a personal phone, a smartphone, a tablet, a laptop or personal computer, a wearable device, a smart home system, or another mobile or remote device. Additionally or alternatively, external device 172 may include a microphone 178. Microphone 178 may be configured to detect sonic signals emitted near external device 172. For instance, microphone 178 may detect audio signals, ultrasonic signals, subsonic signals, or the like. According to at least one embodiment, microphone 178 may detect ultrasonic signals having a frequency greater than 20 kilohertz (kHz).

In addition, a remote server 176 may be in communication with appliance 100 and/or external device 172 through network 174. In this regard, for example, remote server 176 may be a cloud-based server, and is thus located at a distant location, such as in a separate state, country, etc. According to an exemplary embodiment, external device 172 may communicate with a remote server 176 over network 174, such as the Internet, to transmit/receive data or information, provide user inputs, receive user notifications or instructions, interact with or control appliance 100, etc. In addition, external device 172 and remote server 176 may communicate with appliance 100 to communicate similar information.

In general, communication between appliance 100, external device 172, remote server 176, and/or other user devices or appliances may be carried using any type of wired or wireless connection and using any suitable type of communication network, non-limiting examples of which are provided below. For example, external device 172 may be in direct or indirect communication with appliance 100 through any suitable wired or wireless communication connections or interfaces, such as network 174. For example, network 174 may include one or more of a local area network (LAN), a wide area network (WAN), a personal area network (PAN), the Internet, a cellular network, any other suitable short- or long-range wireless networks, etc. In addition, communications may be transmitted using any suitable communications devices or protocols, such as via Wi-Fi®, Bluetooth®, Zigbee®, wireless radio, laser, infrared, Ethernet type devices and interfaces, etc. In addition, such communication may use a variety of communication protocols (e.g., TCP/IP, HTTP, SMTP, FTP), encodings or formats (e.g., HTML, XML), and/or protection schemes (e.g., VPN, secure HTTP, SSL).

External communication system 170 is described herein according to an exemplary embodiment of the present subject matter. However, it should be appreciated that the exemplary functions and configurations of external communication system 170 provided herein are used only as examples to facilitate description of aspects of the present subject matter. System configurations may vary, other communication devices may be used to communicate directly or indirectly with one or more associated appliances, other communication protocols and steps may be implemented, etc. These variations and modifications are contemplated as within the scope of the present subject matter.

Figure 4:
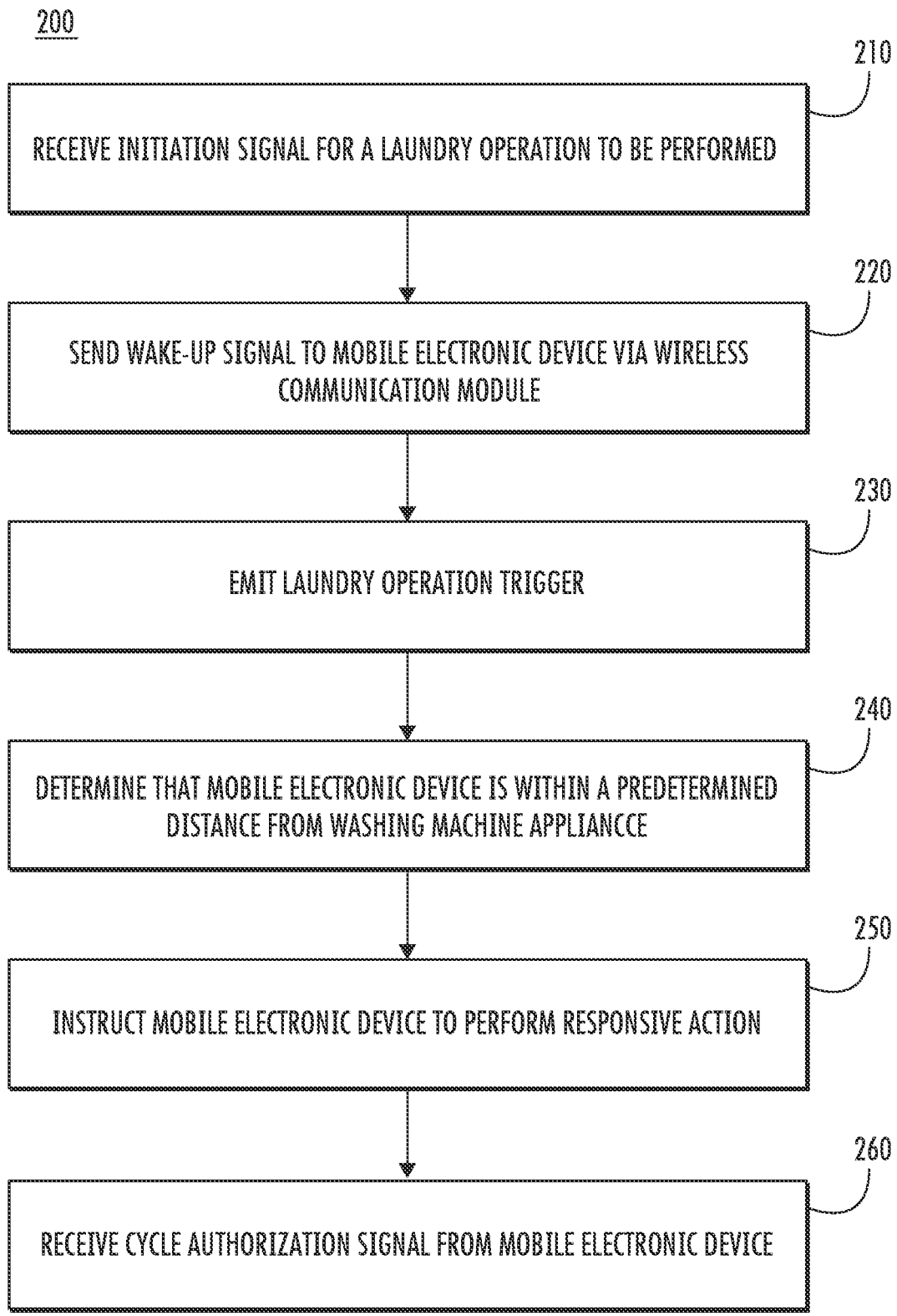
FIG. 4 provides a flow chart illustrating a method of operating a washing machine appliance according to an exemplary embodiment.

Referring now to FIG. 4, a method 200 of operating a washing machine appliance will be discussed. For instance, the exemplary method 200 may be utilized to operate the washing machine appliance 100 and components thereof of FIGS. 1 through 3. Accordingly, the method 200 will be described below in the context of operating washing machine appliance 100. However, it will be appreciated that the exemplary method 200 is applicable to operation of a variety of other washing machine appliances, such as horizontal axis washing machine appliances. Further, it should be appreciated that variations and modifications to method 200 (e.g., the repetition or reordering of certain steps) are possible and within the scope of the present subject matter.

At step 210, method 200 may include receiving an initiation signal for a laundry operation to be performed by the washing machine appliance. In detail, the controller (e.g., controller 156) of the washing machine appliance may receive a signal indicating that a user intends to begin a laundry operation. The laundry operation may be a washing operating, a rinsing operation, or any suitable laundry operation. In some embodiments, the laundry operation includes supplying water (e.g., via water supple conduit 160) to the tub (e.g., tub 108). The initiation signal may be received from a control panel (e.g., control panel 150) of the washing machine appliance. For instance, a user may operate a button (e.g., input selector 152) on the control panel to initiate the laundry operation. Additionally or alternatively, the controller may receive the initiation signal via a remote mobile electronic device (e.g., external device 172).

At step 220, method 200 may include sending a wake-up signal to a mobile electronic device via a wireless communication module. In detail, the controller may send an electronic signal (e.g., via external communication system 170) to the mobile electronic device. The mobile electronic device may or may not be the same mobile electronic device used to send the initiation signal for the laundry operation. Additionally or alternatively, the wake-up signal may be sent to multiple mobile electronic devices. In this description, the mobile electronic device may refer to one or more of a personal cell phone, a smart watch, a mobile tablet, a personal data assistant, or any smart device. For instance, the mobile electronic device may be any electronic device with communicative ability (e.g., via Wi-Fi®, Bluetooth®, or the like).

The wake-up signal may comprise a command to activate a microphone (e.g., microphone 178) of the mobile electronic device. For instance, the wake-up signal may establish a virtual connection between the washing machine appliance (e.g., the controller thereof) and the mobile electronic device. In some embodiments, the virtual connection may be through a mobile application stored on the mobile electronic device. Thus, the wake-up signal may command the microphone of the mobile electronic device to be activated. For instance, the wake-up signal may instruct the microphone to begin detecting sonic signals. As will be described in further detail below, the sonic signals may be emitted by one or more parts of the washing machine appliance.

At step 230, method 200 may include emitting a laundry operation trigger. In detail, after the wake-up signal has been sent to the mobile electronic device, the controller may instruct the washing machine appliance to emit the laundry operation trigger. The laundry operation trigger may include one or more of a sonic signal, an audio signal, or any other noise created and emitted by the washing machine appliance. According to at least one embodiment, the controller may instruct the washing machine appliance to emit a sonic signal, e.g., from a transducer (e.g., an electroacoustic transducer, speaker driver, ultrasonic transducer, etc.) provided within the control panel (or embedded within the controller). The sonic signal may be an ultrasonic signal. For instance, the controller may instruct the transducer to emit a sonic signal having a frequency greater than 20 kHz. Since the typical range for audible sounds for humans is between 20 Hz and 20 kHz, the ultrasonic signal may thus be undetectable to human ears but detectable by the mobile electronic device (e.g., by the microphone of the mobile electronic device). The sonic signal may have any suitable length or pattern, e.g., a pulse, a solid signal, etc.

According to another embodiment, the controller may instruct the transducer to emit an audio signal. In detail, the laundry operation trigger may be a sonic signal with a frequency between 20 Hz and 20 kHz. Accordingly, the sonic signal may be audible to humans and still detectable by the microphone of the mobile electronic device. Similar to the ultrasonic signal, the audio signal may have any suitable length or pattern, e.g., a pulse, a solid signal, etc. Additionally or alternatively, the laundry operation trigger may include a combination of the audio signal and the ultrasonic signal. Advantageously, the redundant signal may ensure that the laundry operation trigger is detected by the mobile electronic device.

According to still another embodiment, the laundry operation trigger may include a noise generated by the washing machine appliance. For instance, the laundry operation trigger may be a noise generated by the drain pump (e.g., drain pump assembly 130). In detail, after sending the wake-up signal to the mobile electronic device, the controller may instruct the drain pump to perform an operation (e.g., a draining operation). Accordingly, the noise or audio signal generated by the activation of the drain pump may function as the laundry operation trigger. The microphone of the mobile electronic device may detect the noise generated by the drain pump.

According to still another embodiment, the laundry operation trigger may include a noise or audio signal generated by the door (e.g., door 120) performing a locking operation. For instance, when the controller receives the initiation signal for the laundry operation to be performed, the controller may instruct the door to be locked. Thus, according to some embodiments, the locking of the door produces an audible noise (e.g., via reed switches, magnets, hooks, etc.). The noise generated by the locking operation may be detected by the microphone of the mobile electronic device. It should be understood that any suitable audio signal, sonic signal, or noise may be incorporated as the laundry operation trigger, and the disclosure is not limited to those examples described herein.

At step 240, method 200 may include determining that the mobile electronic device is within a predetermined distance from the washing machine appliance. In detail, after emitting the laundry operation trigger, the controller may determine that the mobile electronic device detected the laundry operation signal, and is therefore within the predetermined distance from the washing machine. For instance, as described above, the mobile electronic device and the washing machine appliance may be in communication with each other (e.g., via network 174). Thus, upon detecting the laundry operation trigger, the mobile electronic device may alert the controller of the washing machine appliance that it is within the predetermined distance. According to some embodiments, the predetermined distance may be within about 5 feet to within about 10 feet of the wash tub. Additionally or alternatively, the predetermined distance may be limited to within the tub. For instance, the transducer may emit such a signal that can only be detected within the tub.

According to at least one embodiment, the mobile electronic device may notify the controller of the washing machine appliance that the laundry operation trigger was detected. Accordingly, since the source of the laundry operation trigger is within the washing machine appliance, the controller determines that the mobile electronic device is within the predetermined distance simply by being able to detect the laundry operation trigger. Additionally or alternatively, the controller may confirm a location of the mobile electronic device by receiving a location signal from the mobile electronic device. For instance, the controller may receive a GPS location signal from the mobile electronic device after the mobile electronic device detects the laundry operation trigger. In some embodiments, the controller confirms a location of the mobile electronic device via a wireless connection between the mobile electronic device and the washing machine appliance.

Additionally or alternatively, the mobile electronic device may analyze certain characteristics of the laundry operation trigger. For instance, the mobile electronic device may determine a strength of the sonic (or ultrasonic) signal emitted by the controller of the washing machine appliance (e.g., in decibels (dB)). If the strength of the signal is above a predetermined threshold, the controller may confirm that the mobile electronic device is within the predetermined distance. Similarly, the mobile electronic device may determine a decibel level of the noise generated by the washing machine appliance (e.g., the drain pump, the door, etc.) is above the predetermined threshold. Accordingly, the controller may confirm that the mobile electronic device is within the predetermined threshold.

At step 250, method 200 may include instructing the mobile device to perform a responsive action. In detail, upon determining that the mobile electronic device is within the predetermined distance to the washing machine appliance, the controller may instruct the mobile electronic device to perform an alert to alert the user as to the location of the mobile electronic device. In at least one example, the mobile electronic device generates and emits an audible alert tone. The audible alert tone may be an alarm noise, a command, or any audio signal that can be recognized by a user. The audible alert tone may have any suitable form, such as a single tone, a melodic tone, a patterned tone, etc. It should be understood that the form and composition of the audible alert tone is not limited to the examples described herein, and any suitable form, composition, strength, or length of tone may be used.

According to another embodiment, the responsive action includes instructing the mobile electronic device to vibrate. In detail, the controller may instruct the mobile electronic device to activate a vibrating feature therein. The vibration may be performed in conjunction with the audible alert tone, or may be performed separately. The vibration may have any suitable form, such as a long vibration, a burst vibration, a patterned vibration, etc. It should be understood that the form and composition of the vibration is not limited to the examples described herein, and that any suitable form, composition, strength, or length of vibration may be used.

According to yet another embodiment, the responsive action includes activating one or more light sources on the mobile electronic device. In detail, the controller may instruct the mobile electronic device to activate a light source (e.g., a screen, a light emitting diode (LED), a flash, etc.) in response to determining that the mobile electronic device is within the predetermined distance from the washing machine appliance. The activation of the one or more light sources may be performed in conjunction with the audible alert tone and the vibration. Additionally or alternatively, at least two of the responsive actions may be performed while omitting a third responsive action. For example, the responsive action may include the audible alert tone and the light sources, the vibration and the light sources, or the audible alert tone and the vibration. It should be understood that any suitable combination of responsive actions may be performed.

Additionally or alternatively, the controller may initiate the laundry operation in the event that the mobile electronic device is not within the predetermined distance from the washing machine appliances. In detail, the controller may emit the laundry operation trigger. Subsequently, the mobile electronic device may not register or detect the laundry operation trigger. The controller may then not receive a confirmation that the mobile electronic device is within the predetermined distance. Accordingly, the controller may initiate the laundry operation safely.

At step 260, method 200 may include receiving a cycle authorization signal to initiate the laundry operation. For example, the controller may receive the authorization signal from the mobile electronic device. In detail, upon performing the responsive action, the user may retrieve the mobile electronic device. The user may acknowledge possession of the device, e.g., via a mobile application on the mobile electronic device's user interface. Accordingly, the mobile electronic device may send the confirmation signal to the controller of the washing machine appliance to initiate the laundry operation. The cycle authorization signal may be generated by an interaction with a user interface (e.g., touchscreen, buttons, toggles, etc.), a voice activation, a physical gesture, or the like. For instance, the user may press a button on the mobile electronic device confirming that the device is safe (e.g., not within the wash tub) and that the laundry operation may begin. Accordingly, the washing machine appliance may begin the laundry operation. Advantageously, the user may avoid accidentally damaging the mobile electronic device by running a laundry cycle including the mobile electronic device within the wash chamber.

According to another embodiment, the cycle authorization signal may be initiated on the washing machine appliance (e.g., control panel 150). In detail, after the mobile electronic device performs the responsive action, the user may confirm that the mobile electronic device is within the vicinity of the washing machine appliance but outside of the wash chamber. Accordingly, the user may simply deliver the cycle authorization signal via the control panel of the washing machine appliance.

As described herein, the present disclosure relates to a method for preventing an accidental washing of mobile electronic devices, such as mobile phones or the like. A connected appliance, such as a washing machine, may communicate wirelessly with one or more mobile electronic devices. Upon performing an action to initiate a laundry operation (e.g., washing operation), the washing machine may send a wake-up signal to the one or more mobile electronic devices, thus activating the microphone of the device. The washing machine may then generate a noise, tone, or other sonic signal, which may be detected by the now activated microphone of the mobile electronic device. If the noise, tone, or sonic signal is detected by the mobile electronic device above a certain threshold, the mobile device may perform a responsive action to alert the user as to the proximity of the mobile electronic device to the washing machine. The user may then confirm possession of the mobile electronic device (or that it is otherwise not within the washing chamber). Thus, the laundry operation may be performed without the mobile electronic device within the washing chamber.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A washing machine appliance, comprising:
a cabinet;
a door to selectively open and close the cabinet;

a tub provided within the cabinet, the tub configured to hold wash fluid;

a wash basket rotatably mounted within the tub and configured to hold items for washing;

a wireless communication module provided within the cabinet and configured to send and receive wireless signals; and a controller in operative communication with the wireless communication module, wherein the controller is configured to perform a series of operations, the series of operations comprising:

receiving an initiation signal for a laundry operation to be performed by the washing machine appliance;

sending a wake-up signal to a mobile electronic device via the wireless communication module in response to receiving the initiation signal;

emitting a laundry operation trigger prior to initiating the laundry operation;

determining that the mobile electronic device is within a predetermined distance from the washing machine appliance in response to generating the laundry operation trigger;

receiving a cycle authorization signal; and initiating the laundry operation.

2. The washing machine appliance of claim 1, wherein the laundry operation trigger is a sonic signal generated by the controller and emitted by a transducer.

3. The washing machine appliance of claim 2, wherein the sonic signal is an ultrasonic signal emitted at a frequency above 20 kilohertz.

4. The washing machine appliance of claim 1, wherein the laundry operation trigger is an audio signal generated by the washing machine appliance.

5. The washing machine appliance of claim 4, wherein the washing machine appliance further comprises a drain pump in fluid communication with the tub, and wherein the audio signal is generated by an activation of the drain pump.

6. The washing machine appliance of claim 4, wherein the audio signal is generated by the door performing a locking operation.

7. The washing machine appliance of claim 1, wherein determining that the mobile electronic device is within the predetermined distance comprises:

receiving a location signal from the mobile electronic device after emitting the laundry operation trigger.

8. The washing machine appliance of claim 1, wherein the mobile electronic device comprises a microphone, and wherein the wake-up signal comprises a command to activate the microphone.

9. The washing machine appliance of claim 8, wherein the series of operations further comprises:

instructing the mobile electronic device to perform a responsive action in response to determining that the mobile electronic device is within a predetermined distance from the washing machine appliance.

10. The washing machine appliance of claim 9, wherein the responsive action comprises at least one of generating an audible tone, initiating a vibration of the mobile electronic device, or activating one or more light sources on the mobile electronic device.

11. A method of operating a washing machine appliance, the washing machine appliance comprising a cabinet including a tub, a wireless communication module provided within the cabinet and configured to send and receive wireless signals, and a controller in operative communication with the wireless communication module, the method comprising:

receiving an initiation signal for a laundry operation to be performed by the washing machine appliance;

sending a wake-up signal to a mobile electronic device via the wireless communication module in response to receiving the initiation signal;

emitting a laundry operation trigger prior to initiating the laundry operation;

determining that the mobile electronic device is within a predetermined distance from the washing machine appliance in response to generating the laundry operation trigger;

receiving a cycle authorization signal; and initiating the laundry operation.

12. The method of claim 11, wherein the laundry operation trigger is a sonic signal generated by the controller and emitted by a transducer.

13. The method of claim 12, wherein the sonic signal is an ultrasonic signal emitted at a frequency above 20 kilohertz.

14. The method of claim 11, wherein the laundry operation trigger is an audio signal generated by the washing machine appliance.

15. The method of claim 14, wherein the washing machine appliance further comprises a drain pump in fluid communication with the tub, and wherein the audio signal is generated by an activation of the drain pump.

16. The method of claim 14, wherein the washing machine appliance further comprises a door pivotally connected to the cabinet, and wherein the audio signal is generated by the door performing a locking operation.

17. The method of claim 11, wherein determining that the mobile electronic device is within the predetermined distance comprises:

receiving a location signal from the mobile electronic device after emitting the laundry operation trigger.

18. The method of claim 17, wherein the mobile electronic device comprises a microphone, and wherein the wake-up signal comprises a command to activate the microphone.

19. The method of claim 18, further comprising:

instructing the mobile electronic device to perform a responsive action in response to determining that the mobile electronic device is within a predetermined distance from the washing machine appliance.

20. The method of claim 19, wherein the responsive action comprises at least one of generating an audible tone, initiating a vibration of the mobile electronic device, or activating one or more light sources on the mobile electronic device.

* * * * *